(12) United States Patent
Ogawa et al.

(10) Patent No.: US 8,330,726 B2
(45) Date of Patent: Dec. 11, 2012

(54) POSITION DETECTION APPARATUS USING AREA IMAGE SENSOR

(75) Inventors: Yasuji Ogawa, Ibaraki (JP); Kenji Tsunezaki, Tokyo (JP)

(73) Assignees: Xiroku, Inc., Ibaraki (JP); EIT Co., Ltd., Tokyo (JP)

( * ) Notice: Subject to any disclaimer, the term of this patent is extended or adjusted under 35 U.S.C. 154(b) by 300 days.

(21) Appl. No.: 10/557,325

(22) PCT Filed: Apr. 23, 2004

(86) PCT No.: PCT/JP2004/005961
§ 371 (c)(1),
(2), (4) Date: Dec. 14, 2006

(87) PCT Pub. No.: WO2004/104810
PCT Pub. Date: Dec. 2, 2004

(65) Prior Publication Data
US 2007/0089915 A1    Apr. 26, 2007

(30) Foreign Application Priority Data

May 19, 2003 (JP) .................................. 2003-139860

(51) Int. Cl.
*G06F 3/041* (2006.01)
(52) U.S. Cl. .................... 345/173; 178/18.01; 178/18.03
(58) Field of Classification Search .......... 345/173–183; 178/18.01–18.04
See application file for complete search history.

(56) References Cited

U.S. PATENT DOCUMENTS

| 3,021,711 A | 2/1962 | Gunnar |
| 3,722,288 A | 3/1973 | Weber |
| 3,819,857 A | 6/1974 | Inokuchi |
| 4,353,050 A | 10/1982 | Pelczyk et al. |
| 4,529,959 A | 7/1985 | Ito et al. |
| 4,658,373 A | 4/1987 | Murakami et al. |
| 4,918,418 A | 4/1990 | Tsala et al. |
| 4,944,187 A | 7/1990 | Frick et al. |
| 4,951,036 A | 8/1990 | Grueter et al. |

(Continued)

FOREIGN PATENT DOCUMENTS

DE    102 52 862 B3    7/2004

(Continued)

OTHER PUBLICATIONS

PCT/JP2004/005961; Jun. 15, 2004; Search Report; 2 pp.

(Continued)

*Primary Examiner* — Jason Mandeville
(74) *Attorney, Agent, or Firm* — Wells St. John P.S.

(57) ABSTRACT

A position detection apparatus, with which the setting position adjustment of imaging sections is not required and the maintenance can be made easily, structuring of which can be realized with low-cost components, is provided. In the position detection apparatus, imaging sections (7), each of those which includes an area image sensor (70), in which light-sensitive elements are arrayed in a two-dimensional pattern, and an image formation lens (71), are placed to the lateral two points of a detection plane (1), respectively. A selection device (10) selects particular pixels corresponding to a particular field of view of a reflex reflection frame (4) or the like from the light-sensitive elements within a range of a given field of view having been imaged by the imaging sections (7). An image processing device (11) image-processes a particular image signal corresponding to the selected particular pixels and then outputs an indicating position coordinate of a pointing device (2).

19 Claims, 12 Drawing Sheets

U.S. PATENT DOCUMENTS

| | | | |
|---|---|---|---|
| 5,420,379 A | 5/1995 | Zank et al. | |
| 5,434,370 A * | 7/1995 | Wilson et al. | 178/19.01 |
| 5,543,588 A | 8/1996 | Bisset et al. | |
| 5,579,037 A * | 11/1996 | Tahara et al. | 345/173 |
| 5,646,377 A | 7/1997 | Oda | |
| 5,861,583 A | 1/1999 | Schediwy et al. | |
| 6,338,199 B1 | 1/2002 | Chigira et al. | |
| 6,370,965 B1 | 4/2002 | Knapp | |
| 6,421,042 B1 * | 7/2002 | Omura et al. | 345/157 |
| 6,471,613 B1 | 10/2002 | Botosan et al. | |
| 6,480,187 B1 * | 11/2002 | Sano et al. | 345/175 |
| 6,587,099 B2 * | 7/2003 | Takekawa | 345/175 |
| 6,594,023 B1 * | 7/2003 | Omura et al. | 356/620 |
| 6,608,619 B2 * | 8/2003 | Omura et al. | 345/175 |
| 6,747,631 B1 | 6/2004 | Sakamaki et al. | |
| 6,803,906 B1 * | 10/2004 | Morrison et al. | 345/173 |
| 6,914,427 B2 | 7/2005 | Gifford et al. | |
| 7,343,813 B1 | 3/2008 | Harrington | |
| 7,381,128 B2 | 6/2008 | Ogawa et al. | |
| 7,692,625 B2 * | 4/2010 | Morrison et al. | 345/156 |
| 7,703,342 B2 | 4/2010 | Ogawa | |
| 7,800,362 B1 | 9/2010 | Ogawa | |
| 2001/0019325 A1 * | 9/2001 | Takekawa | 345/157 |
| 2002/0075243 A1 * | 6/2002 | Newton | 345/173 |
| 2002/0105589 A1 * | 8/2002 | Brandenberger et al. | 348/360 |
| 2002/0145595 A1 * | 10/2002 | Satoh | 345/173 |
| 2003/0141867 A1 | 7/2003 | Inoue | |
| 2004/0012573 A1 * | 1/2004 | Morrison et al. | 345/173 |
| 2004/0201575 A1 * | 10/2004 | Morrison | 345/173 |
| 2005/0064807 A1 | 3/2005 | Ogawa et al. | |
| 2005/0088424 A1 * | 4/2005 | Morrison et al. | 345/173 |
| 2006/0034486 A1 * | 2/2006 | Morrison et al. | 382/103 |
| 2007/0089915 A1 | 4/2007 | Ogawa | |
| 2007/0146958 A1 | 6/2007 | Babcock et al. | |
| 2007/0214897 A1 | 9/2007 | Ogawa | |
| 2009/0078059 A1 | 3/2009 | Ogawa | |

FOREIGN PATENT DOCUMENTS

| | | |
|---|---|---|
| EP | 1 698 874 | 6/2006 |
| EP | 1873507 | 1/2008 |
| JP | 51-46714 | 12/1976 |
| JP | 52-045823 | 4/1977 |
| JP | 57-100331 | 6/1982 |
| JP | 59-71141 | 5/1984 |
| JP | 61-135240 | 6/1986 |
| JP | 135240/1986 | 8/1986 |
| JP | 62-31865 Y2 | 8/1987 |
| JP | 62-226030 | 10/1987 |
| JP | 1-212301 A | 8/1989 |
| JP | 2-78925 A | 3/1990 |
| JP | 6-10269 Y2 | 3/1994 |
| JP | 6-46171 B2 | 6/1994 |
| JP | 7-55615 A | 3/1995 |
| JP | 09-113203 | 5/1997 |
| JP | 10-198494 | 7/1998 |
| JP | 2000-322201 A | 11/2000 |
| JP | 2001-265517 A | 9/2001 |
| JP | 2002-268807 A | 9/2002 |
| JP | 2002-301264 | 10/2002 |
| JP | 2003-294547 | 10/2003 |
| JP | 2003-337071 | 11/2003 |
| JP | 2005096580 | 4/2005 |
| JP | 2005-156474 | 6/2005 |
| JP | 2005-275760 | 10/2005 |
| JP | 3928976 B1 | 6/2007 |
| WO | WO 02/03315 A1 | 1/2002 |
| WO | WO02/03316 A1 | 1/2002 |
| WO | WO 2004/104810 | 2/2004 |
| WO | WO2005/052532 A1 | 6/2005 |
| WO | WO2006/106714 A1 | 10/2006 |
| WO | WO 2007/014849 A1 | 12/2007 |
| WO | WO 2008/007458 A1 | 1/2008 |
| WO | WO 2008-050468 A1 | 5/2008 |

OTHER PUBLICATIONS

PCT/JP2004/016390; Jan. 12, 2005; Search Report; 2 pp.

PCT/JP2006/306432 Jun. 26, 2006; Search Report; 2 pp.

* cited by examiner

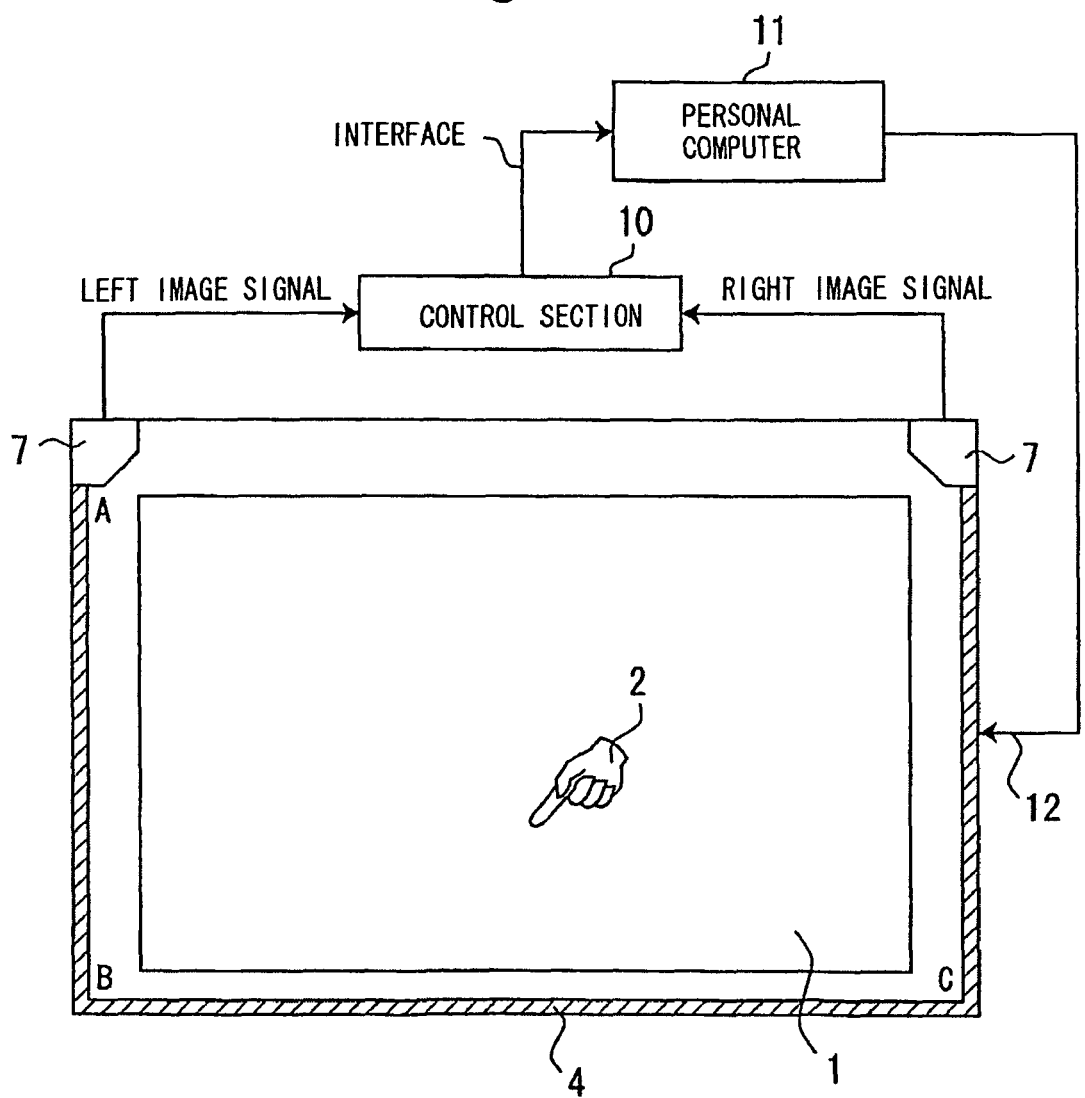

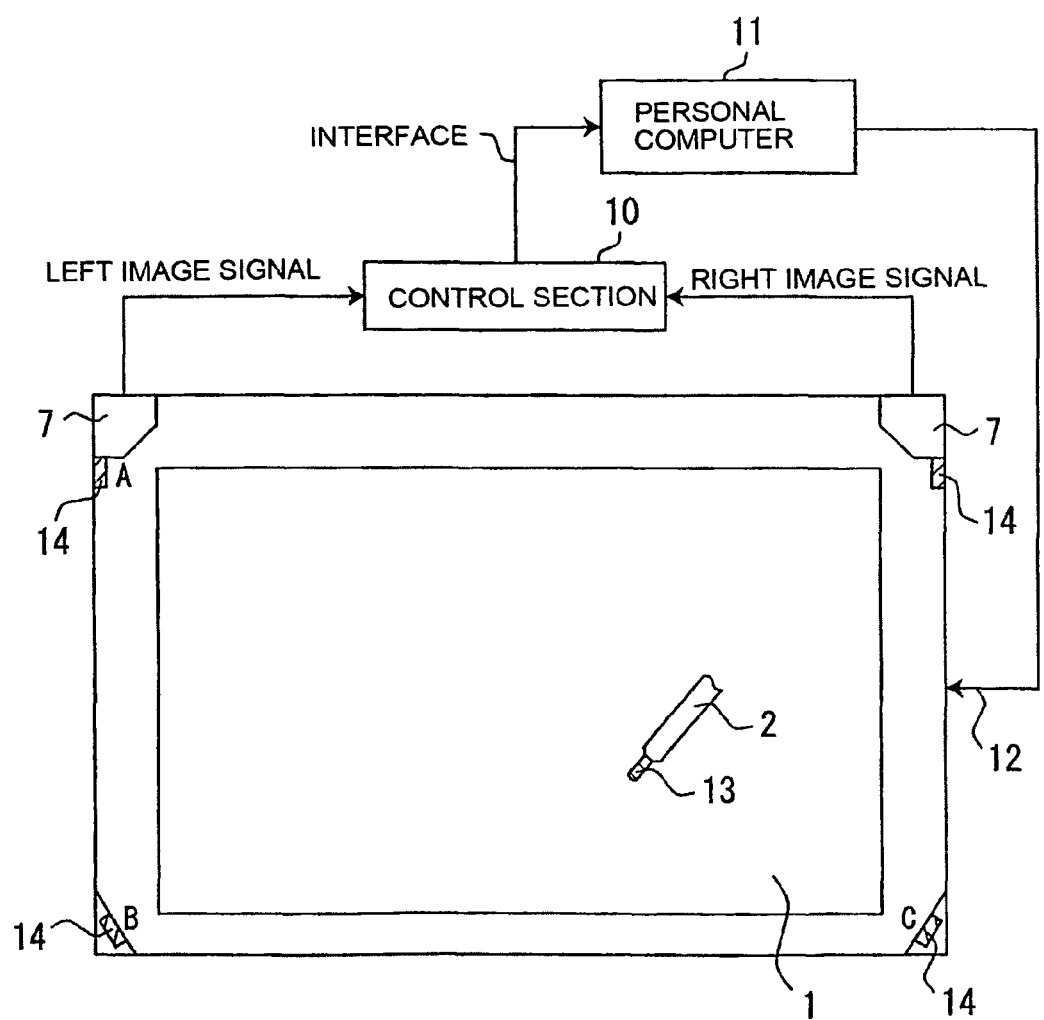

REFLEX REFLECTION MEMBER

REFLEX REFLECTION MEMBER

POSITION DETECTION APPARATUS USING AREA IMAGE SENSOR

CROSS REFERENCE TO RELATED APPLICATION

This is a 35 U.S.C. §371 application of and claims priority to PCT International Application Number PCT/JP2004/005961, which was filed 23 Apr. 2004, and was published in Japanese, and which was based on Japanese Patent Application No. 2003-139860, filed 19 May 2003, and the teachings of all the applications are incorporated herein by reference.

FIELD OF THE INVENTION

The present invention relates to a position detection apparatus for detecting a pointing device that is situated on a detection plane, and particularly to a position detection apparatus in which an area image sensor is used in the imaging section.

DESCRIPTION OF THE RELATED ART

Position detection apparatuses for detecting a pointing device that is situated on a detection plane include the various types, such as an electromagnetic type, a pressure-sensitive type, an optical type and the like. An electromagnetic threshold detection apparatus is adapted to determine a two-dimensional coordinate from a planar distribution of radiant intensity of electromagnetic wave that is irradiated from a pointing device itself. For such a manner of detection, a dedicated pointing device that irradiates electromagnetic wave is required, and it is not possible to use fingers or the like for carrying out input operations.

A position detection apparatus of the pressure-sensitive type works to place a resistive film or the like on a detection plane, detect the indicating position of a pointing device with the resistive film or the like, and output a coordinate of the indicating position. With the position detection apparatus of the pressure-sensitive type, however, there is such a problem that the detection plane is broken when a pointing device of which tip being edged is used. Further, when such a position detection apparatus is used in combination with a display device so that they are applied for a so-called touch-panel display apparatus, there is such a problem that the display becomes dark in the appearance an the like since a displayed surface must be viewed through the resistive film and the like.

The position detection apparatuses of the optical type, such as those disclosed in JP Laid-open No. Sho 62-5428, JP Laid-open No. Hei 11-85377 and the like, work to image a pointing device placed on a detection plane from two points by means of two imaging sections to determine an indicating position coordinate of the pointing device according to the principle of trigonometrical survey. Besides the above-mentioned apparatus, the position detection apparatuses of the optical type include, for example, the one that detects the shape of a pointing device by means of image recognition or the like to output an indicating position coordinate and the one in which a reflex reflection member for reflecting incident light toward the incident direction is provided on a pointing device or on the surrounding of a detection plane and light is irradiated from a light source to the reflex reflection member to output an indicating position coordinate from the position of the light-irradiated part or the shaded part. FIG. 1 is a top view of the optical position detection apparatus of the interception type that detects the indicating position of a pointing device according to the principle of trigonometrical survey. This apparatus works to image a pointing device such as a finger placed on a detection plane 1 by means of two imaging sections. For example, a light source such as an LED or the like is provided in the imaging section 3 so that the light source irradiates light toward a detection plane 1, the light is incident to a reflex reflection frame 4, and the light having returned from the incident direction by reflection is imaged with a sensor in the imaging section 3. When the pointing device 2 is placed on the detection plane 1, the part on which the pointing device is placed is imaged as a shade by the imaging section 3. Accordingly, an indicating position coordinate can be worked out from the position of the shaded part by means of the principle of trigonometrical survey. Since the detection plane may be made from a hard material such as protective glass, the optical position detection apparatus can use a pointing device having a hard tip. Further, when applying the optical position detection apparatus for a touch-panel display apparatus, the optical position detection apparatus can be applied conveniently since the position detection apparatus has no influence on the display. Furthermore, the optical position detection apparatus can be applied for a display apparatus with a large dimension. Hence, it is understood that the demand for the optical position detection apparatus will be increasingly raised from now on.

The sensor in the imaging section used for such an optical position detection apparatus is usually consisted of a linear image sensor. This is because of that, for the detection of a pointing device, information on the height direction is basically not required, and it is enough if the position of shade or light in the horizontal direction can be detected.

However, in case of the optical position detection apparatus, it has been so difficult to perform the position adjustment of the imaging section to be used for the apparatus. That is, since the linear image sensor is a sensor being structured in one line, it has been difficult to adjust the field of view of the imaging section structured in one line so as to be parallel alongside of the detection plane and to a position being closer to the detection plane. As an example of the linear image sensor that intends to solve such a problem of difficulty in the adjustments of the setting angle and setting position, there is one such as disclosed in JP Laid-open No. Hei 11-85399, which can finely adjust the height and inclination of the imaging section by means of screws, for example.

As described above, with the optical position detection apparatuses, it was so difficult to adjust the setting position of the imaging section. Even though a mechanism that can adjust the height and inclination by means of screws is provided, it is difficult for amateurs to accurately adjust the field of view of the imaging section so as to be parallel to the detection plane. Besides, even though the accurate adjustment has been made at the time of product delivery, the position may be in disorder during the transportation and/or the setting. Furthermore, when the apparatus is applied to a detection plane with a large dimension, the position of the imaging section may be changed due to the deformation of the detection plane induced by temperature changes or the like, which resulting in the displacement of the field of view. In such a case, since it is almost impossible to carry out the position adjustment at the end user side, it has been required to ask maintenance service or the like in order to complete the adjustment.

In order to avoid the position adjustment of the imaging section from being severe, it may be a solution to widen the angle of field of an image formation lens as well as in the vertical direction to thereby widen the field of view of the imaging section in the vertical direction of the detection plane. FIG. 2 is a view of the position detection apparatus as shown in FIG.

1 when it is viewed from the lateral side. The position detection apparatus may be structured such that the reflex reflection frame 4 is included in the field of view by widening the field of view 5 of the imaging section 3 in the vertical direction as shown in the drawing with use of an image formation lens or the like, even when the setting position of the imaging section 3 has been displaced. However, when the field of view is widened in the vertical direction, there may be influence caused by light from the exterior and the like. That is, despite that the shade of the pointing device 2 being only in the vicinity of the detection plane 1 and needs to be detected for the position detection, there may be such a case that a shade caused by light from the exterior, such as sunlight and fluorescent light, is recognized in error as a shade caused by the pointing device to thereby output an erroneous coordinate. Therefore, it has been difficult to widen the field of view of the imaging section in the vertical direction of the detection plane. Note that, besides the example where the reflex reflection frame is provided around the detection plane, there is an example where a reflex reflection member is provided to the pointing device and the part irradiated with light is detected to thereby work out the indicating position of the pointing device. In the later example, however, light from the exterior cannot be distinguished from the pointing device, thus resulting in an erroneous recognition. There may be a solution to make the frame higher in order to eliminate the influence of the light from the exterior, however, there is a problem, for example, of poor maneuverability when the frame being too high is provided.

Further, in order to increase the detection accuracy for the indicating position coordinate, it is required to adjust the field of view of the imaging section to an area being parallel to and in the vicinity of the detection plane as much as possible. The adjustment of the field of view to a position being close to the detection plane is important for preventing erroneous recognition of touching of the pointing device to the detection plane from occurring despite of no actual touching is made and for eliminating errors in the indication position coordinated and the like resulting from deviation between a position to be detected and the detection plane. However, when the detection plane becomes larger in the dimension, the detection may occasionally be influenced by the planarity of the detection plane. When the detection plane 1 is distorted as shown in FIG. 3, the field of view 5 is interrupted on the way owing to the distortion of the detection plane and cannot reach the reflex reflection frame 4 accordingly. Under such a state, it becomes unexecutable to detect the whole detection plane. Therefore, it will be considered as the solution to structure the position detection apparatus such that the height of the imaging section 3 is made higher so that the detection plane is downwardly viewed from the obliquely-upper direction in order to capacitate the imaging section to detect the detection plane entirely. However, when the position of the imaging section 3 is changed to be higher so as to downwardly view the detection plane, the reflex reflection frame 4 at an angled portion on the detection plane 1 is viewed in the inflected state as shown in FIG. 4. In such a case, it becomes impossible to image the entire reflex reflection frame 4 that has been viewed in the inflected state, since the field of view of the linear image sensor structured in one line is likewise linear.

Note that it will also be considered as the other solution to image an area over the detection plane in a wide field of view with use of a camera employing an area image sensor and the like, transmit the image to an image processing section, and then image-process the image to use for the detection of the indicating position coordinate. However, the volume of data to be transmitted from the area image sensor to the image processing section will be enormous since a frame rate as much as 100 frames per second will be required for carrying out detection of the indicating position coordinate. Accordingly, an interface with high-speed performance and a processing device will be required for processing such data, which leads to an expensive cost for producing a product which cannot be practically accepted.

In consideration of solving the above-described problem, it is an object of the present invention to provide a position detection apparatus, with which the setting position adjustment of the imaging section is needless, which permits easy maintenance, is not influenced by environmental change such as temperature changes, and can be constructed with low-cost components.

SUMMARY OF THE INVENTION

In order to achieve the above-described object of the present invention, the position detection apparatus according to the present invention includes an area image sensor in which light-sensitive elements are arrayed in a two-dimensional pattern, an image formation lens, a pair of imaging sections for imaging an area over the detection plane in a given field of view from two lateral points of the detection plane to output an image signal, a selection means for utilizing the image signal as an input to select a particular pixel corresponding to a particular field of view within the range of a given field of view from the light-sensitive elements, and an image processing means for utilizing a particular image signal corresponding to the particular pixel selected by the selection means as an input to execute an image processing and then outputting a coordinate of an indicating position on the detection plane indicated by a pointing device.

In the above-described position detection apparatus according to the present invention, the imaging section may have further a light source for emitting light alongside of the detection plane, and the light source may be arranged in the vicinity of the image formation lens.

Further, a reflex reflection member for reflex reflecting light may be used, and when it is used, the reflex reflection member can be provided to the pointing device or to at least three surrounding sides of the detection plane in the serial state.

The particular field of view corresponding to a particular pixel may be an area that includes a part or the whole of the image of the reflex reflection member.

Further, the position detection apparatus according to the present invention may include a marker means to be imaged by the imaging sections and to be a reference for defining a particular field of view, and the selection means may use the marker means as a reference to select a particular pixel corresponding to a particular field of view from the light-sensitive elements. The marker means may be disposed to at least four (4) points on the detection plane.

Alternatively, the marker means may be a reflex reflection member that is structured such that a reflected image thereof is formed in a characteristic shape or a light-emitting section for emitting light.

When the marker means is a light-emitting section, the section may be structured such that an image produced by light emission is formed in a characteristic shape or such that it emits light only at the time of defining a particular field of view.

Further, the position detection apparatus according to the present invention may include a calibration means, which may be configured such that it causes the selection means to select a particular pixel either automatically at a given interval or manually at operator's option.

The particular pixels that are selected by the selection means can be any one determined selectively from pixels linearly arrayed in accordance with the pixel array, pixels obliquely arrayed, and pixels arrayed with including the inflected part.

The position detection apparatus according to the present invention further includes a memory that stores pixel selection information with respect to particular pixels to be selected by the selection means, and the selection means may be configured such that it uses the pixel selection information having been stored in the memory to output a particular image signal corresponding to the particular pixels from an image signal to be imaged by the imaging section.

Moreover, the position detection apparatus according to the present invention further includes a buffer memory for temporarily storing image signals imaged by the imaging section, and the selection means may be configured such that it uses image selection information having been stored in the memory to output a particular image signal corresponding to particular pixels from the image signals stored in the buffer memory.

In the above-described configuration, the memory is a memory of serial access mode, and the stored pixel selection information may be designed such that it is read out in synchronization with a clock signal to be inputted.

Further, it may be configured such that the selection means and the image processing means are connected by providing a high-speed serial transfer interface therebetween, and that the image processing means is included in a personal computer.

Further, the image processing means may be consisted of a microcomputer, and the coordinate of an indicating position may be configured such that it is outputted via an interface included in the microcomputer.

Further, the position detection apparatus according to the present invention may be structured so as to include a display device, and the detection plane may be a transparent plate for protecting the display screen of the display device.

The position detection apparatus according to the present invention, which detects a pointing device being situated on a detection plane, may be structured such that it includes an area image sensor in which light-sensitive elements are arrayed in a two-dimensional pattern, an image formation lens, a pair of imaging sections for imaging an area over the detection plane in a given field of view from the lateral two points of the detection plane to output an image signal, marker means each to be a reference for defining a given area within the range of an given field of view to be imaged by the imaging sections, an image processing means for inputting the image signal out putted from the imaging sections, defining a given portion of the image signal on the basis of the marker means and using the image signal of the defined given portion to work out a coordinate of an indicating position on the detection plane that is indicated by a pointing device, and a follow-up means for detecting positional variations of the marker means automatically at a prefixed interval or manually in operator's option to renewedly define the given portion.

With use of the above-described means, the following functions can be acquired. That is, it will be needless to execute the adjustment of setting positions of the imaging sections, and instead thereof, the same effect can be achieved by only selecting particular pixels of the area image sensor. Accordingly, as the functions, the number of the assembly steps can be reduced and the quality of the maintenance will be improved. Hence, even though the imaging sections are attached in the inclined state, the position detection apparatus can work by selecting pixels obliquely arraying with respect to the pixel array in the area image sensor. Furthermore, since it is permitted to select a portion that is not straight but is inflected, even when the detection plane is in a warped state, the entire detection plane can be detected easily by providing the imaging sections at slightly higher positions. Still further, since the fields of view of the imaging sections can be set easily such that they are lower in their positions with respect to the level of the detection plane, the detection accuracy can be increased and the maneuverability can be improved. Still further, even though the area image sensor is employed, it is needless to employ a dedicated interface with a high-speed performance or an expensive device because only the particular image signal corresponding to the particular pixels is image-processed. Hence, the position detection apparatus according to the present invention can be produced at a low cost.

BRIEF DESCRIPTION OF THE DRAWINGS

FIG. 5 is a top plan of the position detection apparatus according to the present invention, FIG. 13 is a view for explaining an example where the position detection apparatus according to the present invention is applied for a different system.

DETAILED DESCRIPTION OF THE PREFERRED EMBODIMENTS

Figure 1:
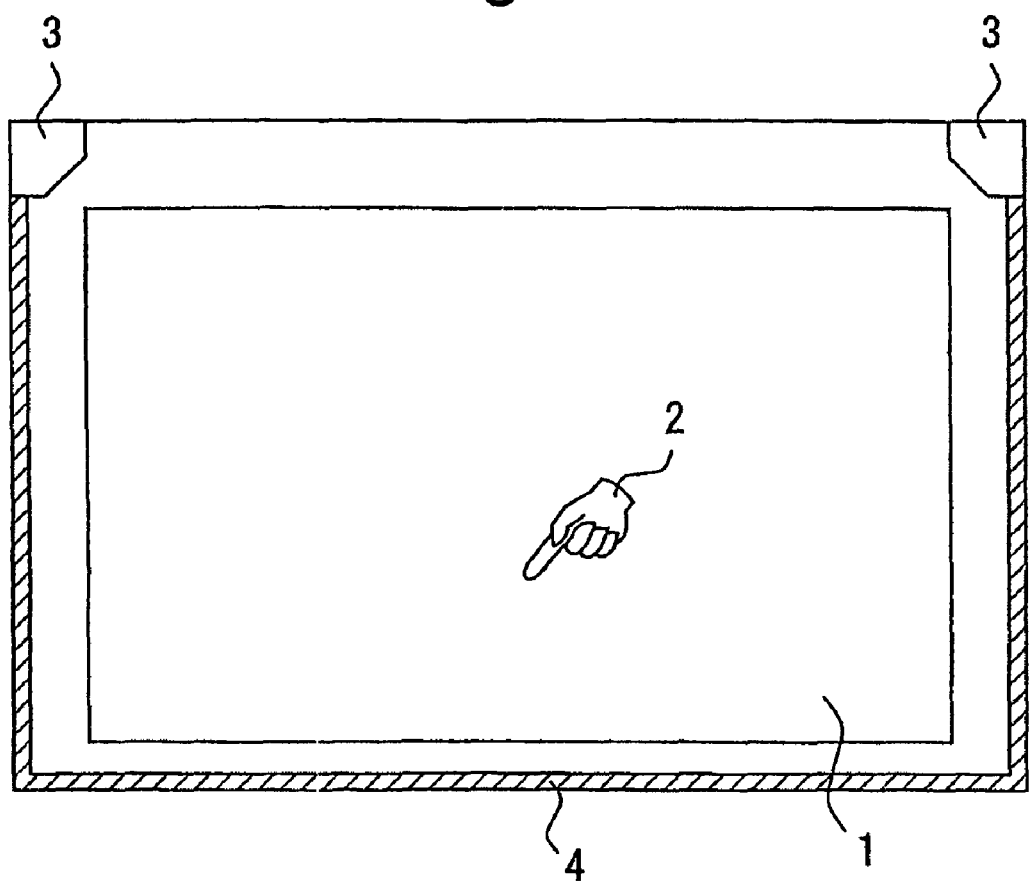
FIG. 1 is a top plan for explaining the configuration of common optical position detection apparatus of the interception type that detects an indicating position of a pointing device in accordance with the principle of the trigonometrical survey.
Figure 2:
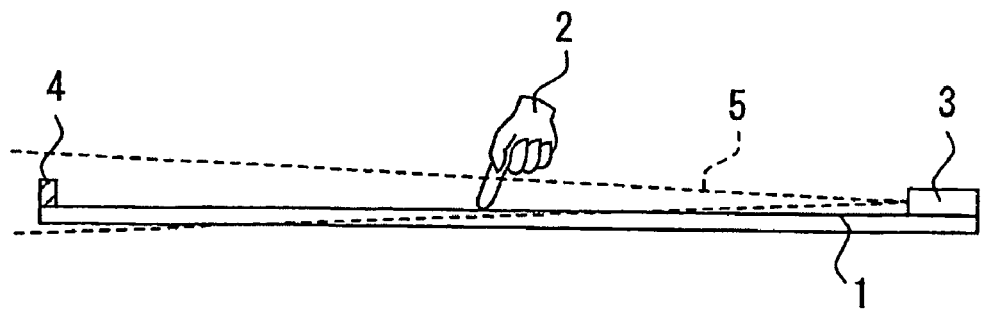
FIG. 2 is a view of the position detection apparatus shown in FIG. 1 when it is viewed in the lateral direction.
Figure 3:
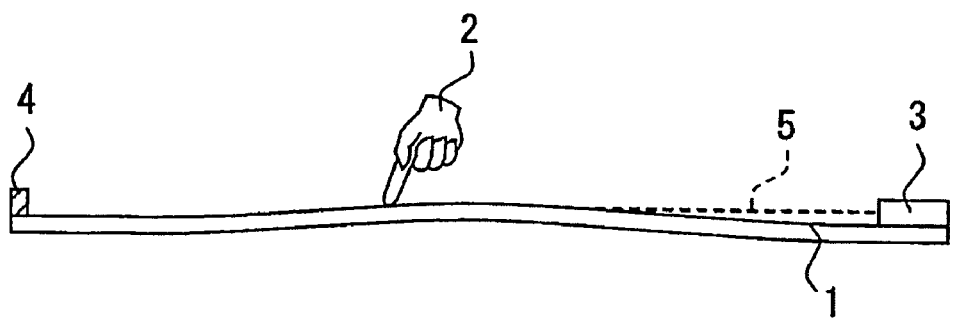
FIG. 3 is a view for explaining the influence on the field of view of the imaging sections when the detection plane has been warped.
Figure 4:
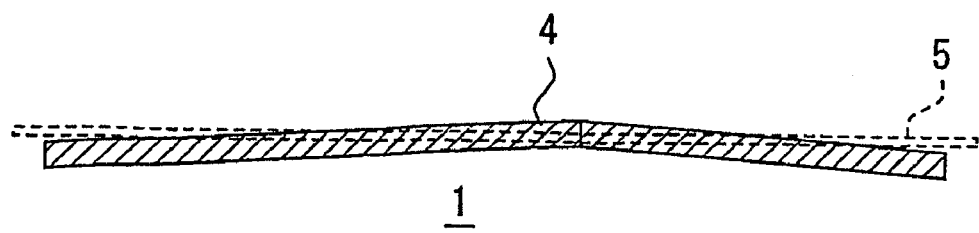
FIG. 4 is a view for explaining an image to be imaged by the imaging sections when the imaging sections are raised in their positions so as to downwardly view the pointing device on the detection plane.

The present invention will now be explained in the following by using the exemplary embodiments described hereinbelow with referring to the appended drawings. FIG. 5 is a top plan of the position detection apparatus according to the present invention. In this drawing, the components with the same reference numerals as those shown in FIG. 1 denote the same components as those components shown in FIG. 1, and the basic configuration of the position detection apparatus of this invention is same as a conventional one shown in FIG. 1. Note that, although an example where a reflex reflection frame 4 is provided to at least three surrounding sides of the detection plane 1 and the position of a shade blocked by a pointing device 2 such as a finger is detected by the imaging sections 7 is mainly explained in FIG. 5, the present invention is not limited to this example, and the position detection apparatus of the present invention may also be configured such that the reflex reflection member is provided to the indication object 2 and the position of light given by the reflex reflection member is detected by the imaging sections 7. Further, the position detection apparatus of this invention may naturally employ as well a system in which the placement of the pointing device 2 on the detection plane 1 is detected by the image processing of an image imaged by the imaging sections 7 without specially using the reflex reflection member, or a system in which a light source is provided to the pointing device itself so that the position of light is detected. The most prominent features of the present invention are those including that the position detection apparatus uses an area image sensor, in which light-sensitive elements are arrayed in a two-dimensional pattern, in the respective imaging sections and that the apparatus is provided with a control section 10 containing a selection means for selecting a particular field of view within the range of a field of view to be imaged by the imaging sections 7. In the following, the present invention will be explained specifically with regard to mainly these features.

The imaging sections 7 used in the position detection apparatus according to the present invention is structured with an area image sensor in which light-sensitive elements are arrayed in a two-dimensional pattern and an image formation lens both being the main components and is arranged onto two lateral sides of the detection plane 1, respectively. The imaging sections are structured to image an area over the detection plane from the two locations and output the image in the form of an image signal. When the reflex reflection member as shown in FIG. 5 is used in the position detection apparatus, a light source is required in the vicinity of the image formation lens. In case of the example shown in FIG. 5, the reflex reflection frame 4 is provided to at least three surrounding sides of the detection plane 1 in solid manner. Because, if the reflex reflection member is not provided like a frame, it becomes unable to detect a shaded portion corresponding to the pointing device 2.

Figure 6A:
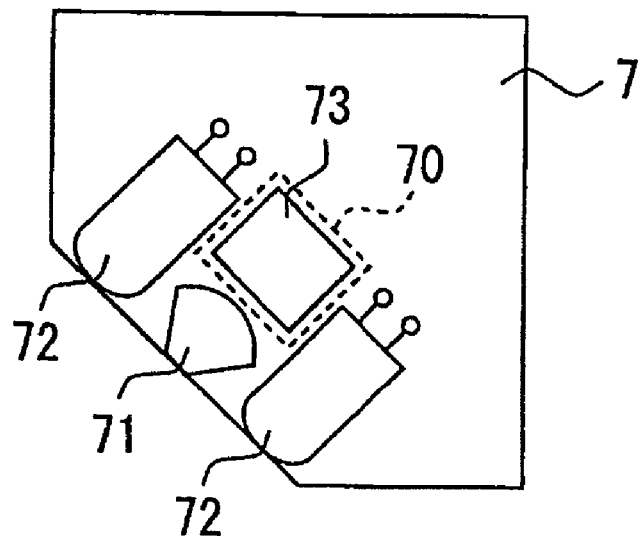
FIG. 6 is a view for explaining an exemplary configuration of the imaging section to be used in the position detection apparatus according to the present invention.
Figure 6B:
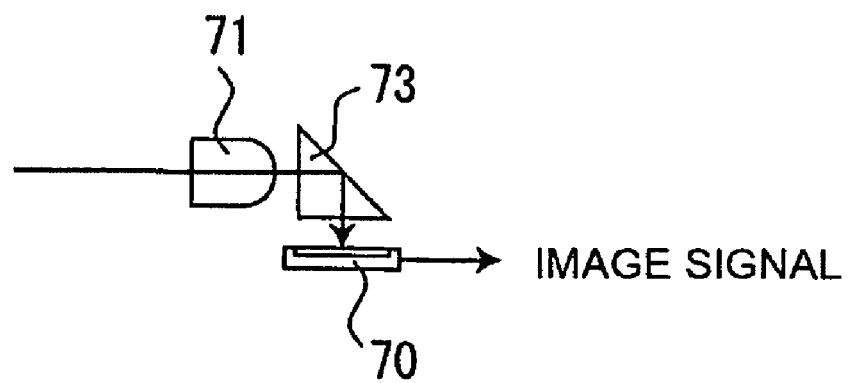

Now, an exemplary configuration of the imaging section 7 will be explained with referring to FIG. 6. FIG. 6 shows an exemplary configuration of the imaging section 7 that can be used in the position detection apparatus according to the present invention. FIG. 6(a) is the top plan thereof, and FIG. 6(b) is the side view thereof. As shown in these drawings, the imaging section 7 includes an area image sensor 70, an image formation lens 71 and light sources 72. For the area image sensor 70, sensors of various types, such as ones of the CCD mode and the CMOS mode, can be used. Note that not only a sensor that outputs an image signal corresponding to all pixels of an image sensor but also a sensor having a mode capable of roughly restricting pixels to the partial range can be used as the area image sensor. In the area image sensor used in the position detection apparatus according to the present invention, it is preferable to use an area image sensor of the CMOS mode that does not separately require an A/D converter for which high-speed operation is required. With use of such an area image sensor, a low production cost can be maintained. For the light source 72, an LED and the like can be used, for example. In the example shown in the drawings, two light sources are provided. However, in the present invention, the light source is not limited to this example and it may be only one. The number and disposal of the light sources may be changed diversely in accordance with the size and the like of the detection plane 1. Besides, though the imaging section is shown in FIG. 6 such that it uses a prism mirror 73 in order to make the dimension smaller, the imaging section is not limited to this example. Naturally, instead of using a prism mirror, an image formation lens and an area image sensor may be apposed. Further, the image formation lens 71 is configured such that it has a wide angle of field in the direction in parallel to the detection plane 1 and can produce a field of view with which the entire detection plane 1 can be imaged. Note that there is no particular limitation as to the angle of field of the image formation lens in the vertical direction with respect to the detection plane 1, since the field of view of the area image sensor can be controlled as described later. Hence, an appropriate angle of field in the vertical direction can be arbitrarily decided.

In the imaging section configured as described above, light is emitted alongside of and in parallel to the detection plane 1 from the light source 72 and is incident to the reflex reflection frame 4. Since the reflex reflection frame 4 reflects light in the incident direction, the light returns to the imaging section 7 renewedly alongside of the detection plane 1. The light is focused with the image formation lens 71 and inflected by 90 degrees when it passes through the prism mirror 73, and the image of the reflex reflection frame is image-formed to the area image sensor 70. Then, the area image sensor outputs an image signal.

The image signal outputted from the area image sensor 10 is transmitted to the control section 10. The control section 10 has a selection means for selecting particular pixels corresponding to a particular field of view within the range of a field of view to be imaged by the imaging sections 7 from the light-sensitive elements. More specifically, the control section has a selection means capable of selecting only particular pixels corresponding to a particular field of view, that is, only particular pixels in the part corresponding to the field of view with which the reflex reflection frame 4 can be imaged, from the pixels of the whole light-sensitive elements contained in the area image sensor 70. In the field of view of the imaging sections 7, for example, in addition to the reflex reflection frame 4, the upper area thereto and the detection plane 1 are also contained. However, the part necessary for the position detection of the pointing device is only the image part of the reflex reflection frame 4. Consequently, it is enough to select particular pixels corresponding to a particular field of view in the image part of the reflex reflection frame 4. Note that, since it is permitted in the selection means to select arbitrary particular pixels of the light-sensitive elements in the area image sensor, it is needless to select the part corresponding to the image of the whole reflex reflection frame 4, and the position detection apparatus with high detection accuracy and good maneuverability can be realized by selecting pixels corresponding to the image of the reflex reflection frame locating in the area closer to the detection plane 1.

Then, the particular image signals corresponding to the selected particular pixels are transmitted respectively from the two imaging sections at right and left sides to a personal computer 11 via a high-speed serial transfer interface means such as USB. Since the particular image signals contain only data of the part corresponding to a particular field of view, it is needless to use a dedicated interface with high-speed performance, and the position detection apparatus can use a common interface such as USB. For the image processing section, a personal computer 11 may be used, and the personal computer 11 processes an image on the basis of the transmitted image signal and outputs an coordinate of an indicating position on the detection plane 1 that is indicated by the pointing device. Specifically, the coordinate on the detection plane 1 is worked out according to the principle of the trigonometrical survey from the position of the shaded portion contained in the particular image signal from the two imaging sections locating at the right and left sides, respectively. Further, when the position detection apparatus according to the present invention is applied, for example, for a touch-panel display apparatus, the detection plane 1 may be made from a transparent plate, and then, a display screen may be superimposed onto the detection plane 1 to set up the display apparatus 12.

Figure 7:
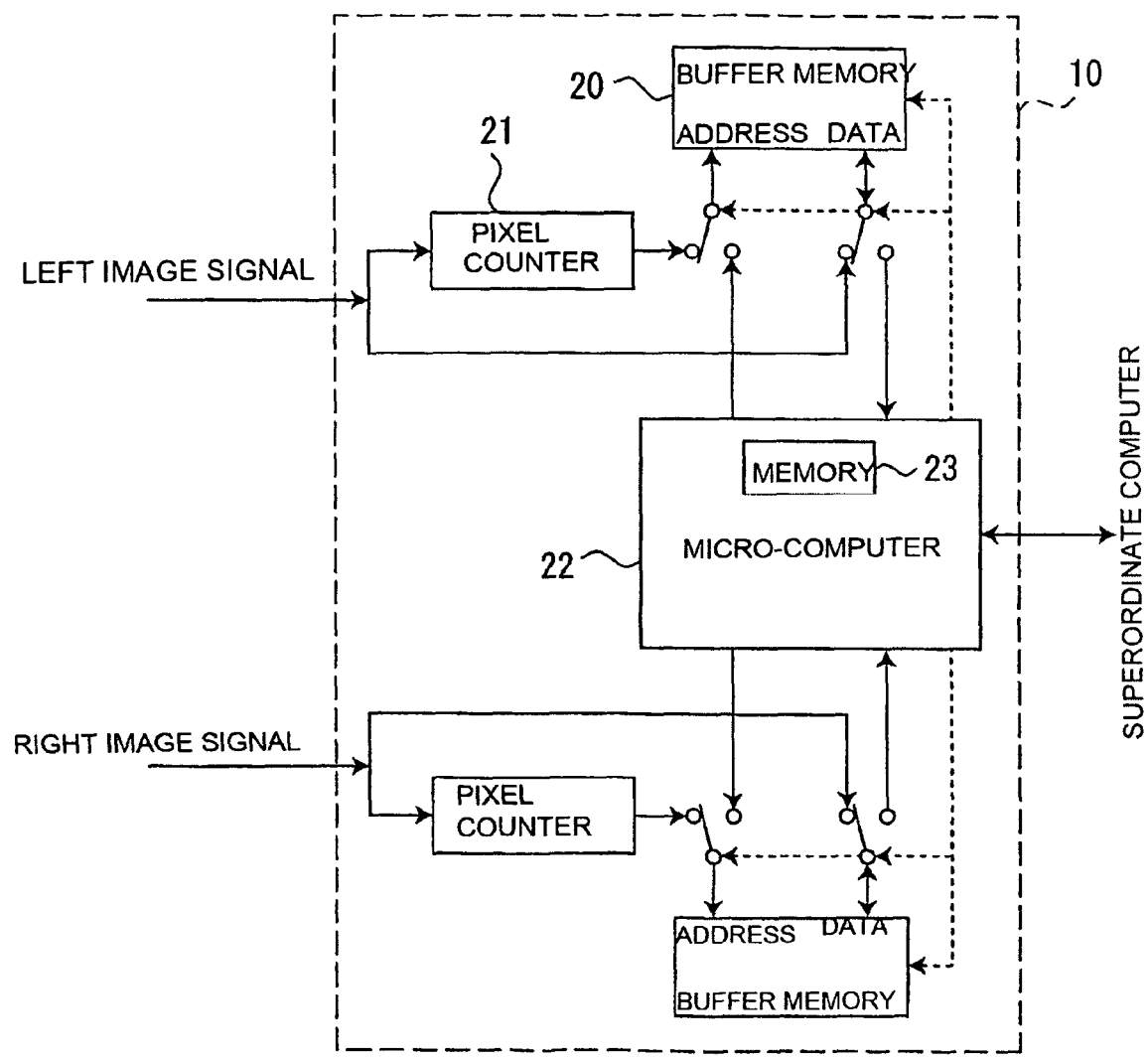
FIG. 7 is a view for explaining an exemplary configuration of the control section to be used in the position detection apparatus according to the present invention.

Now, the selection means to be provided in the imaging sections of the position detection apparatus according to the present invention will be explained in detail with referring to FIG. 7. FIG. 7 is a block diagram for explaining the control section 10 being used in the position detection apparatus according to the present invention. Although the imaging sections in total of two are located at the right and left sides of the apparatus, the processing in the imaging section at the one side will be explained since the image signal processing is carried out in the same procedure for the imaging sections at the respective sides. The image signal transmitted from the area image sensor in the imaging section 7 is stored temporarily in a buffer memory 20. For the buffer memory, it is preferable to use a memory such as an SRAM with which writings and reading-out can be executed at a somewhat high-speed. Note that the image signal to be stored in the buffer memory 20 may be an image signal corresponding to all pixels of the area image sensor, besides when the apparatus has a mode capable of restricting a range for imaging at the area image sensor side, the image signal having been roughly restricted beforehand only to a partial area with use of such a mode may be stored in the buffer memory 20. Then, separately from the image signal, a pixel clock signal in the image signal transmitted alongside of the scanning line of the area image sensor is counted by means of a pixel counter 21, and the counted value is written in the buffer memory 20 as an address. Then, the buffer memory 20 is connected to a microcomputer 22 which is a main component of the control section 10. The microcomputer 22 has an interface such as a USB which is a connecting means with the personal computer 11. Further, the microcomputer has also a memory section 23 such as an SRAM for storing pixel selection information having been set by calibration processing, that will be described later, and the like in the personal computer 11. The microcomputer 22 reads a particular image signal corresponding to particular pixels, that is, an image signal for a part necessary for detecting an indicating position coordinate, from the buffer memory 20 on the basis of the pixel selection information and transmits the read signal to the personal computer 11 via the interface. Instruction for reading-out and writing to the buffer memory 20 may be executed in accordance with the direction from the microcomputer 22. The indicating position coordinate of the pointing device is worked out from the transmitted image by means of a driver software or the like in the personal computer 11.

Figure 8:
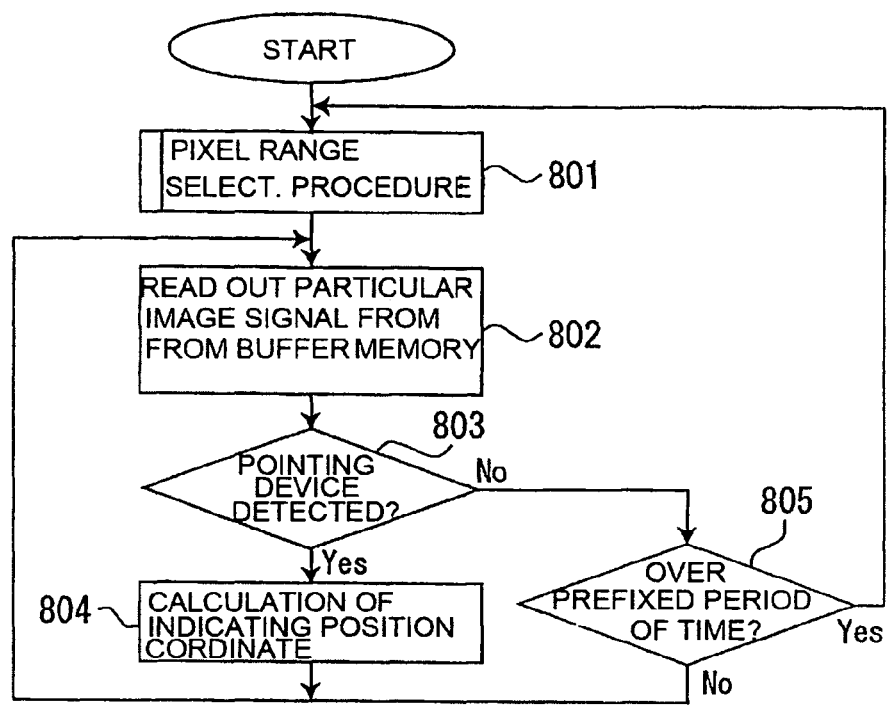
FIG. 8 is a flowchart for explaining the procedure of the indicating position detection of a pointing device in the position detection apparatus according to the present invention.

Next, the detection procedure with use of the position detection apparatus according to the present invention will be explained hereunder with referring to FIG. 8. FIG. 8 is a flowchart for explaining the detection procedure in the position detection apparatus according to the present invention shown in FIG. 5. At first, a procedure for selecting a pixel range, which will be described later in detail, is carried out (Step 801). This step is carried out in order to determine the particular pixels of the area image sensor corresponding to a particular field of view of the imaging sections 7. Then, when the particular pixels are determined, the microcomputer 22 reads out a particular image signal corresponding to the particular pixels from the buffer memory 20 such as an SRAM with referring to the address on the basis of the direction from the personal computer 11 being superordinate (Step 802). The particular image signal having been read out is transmitted to the personal computer 11 via the interface. Then, a state capable of executing the position detection on the detection plane 1 will be made ready. Then, the transmitted particular image signal is referred in the personal computer 11 so that a determination whether the pointing device is detected or not is made (Step 803). When a pointing device 2 is placed on the detection plane 1 in the position detection apparatus shown in FIG. 5, a position of the shade of the pointing device is detected with the imaging sections 7 locating at the right and left sides of the apparatus, respectively. From these positions of the shade, an indicating position coordinate of the pointing device 2 is worked out according to the principle of the trigonometrical survey (Step 804). Then, the procedure returns to Step 802, and the position detection is continued. Note that, in the example in which the reflex reflection frame 4 is not used and a reflex reflection member is provided to the pointing device 2, the position of light is detected when a pointing device is placed, and the coordinate is worked out on the basis of the position of light.

When the pointing device 2 is not detected in Step 803, it is determined whether such an undetected state is continued for a predetermined period of time or not (Step 805). In such a case that the period of the undetected state is determined as shorter than the predetermined period of time, the procedure returns to Step 802 and the position detection is continued. In such a case that the undetected state was continued to exceed the predetermined period of time in Step 805, the procedure returns to Step 801 in this case, and the particular pixels are renewedly determined in accordance with the procedure for selecting a pixel range. With this procedure, the readjustment of a field of view in accordance with a change of the field of view of the imaging sections can be permitted even when the field of view of the imaging sections is changed due to the tremor of the imaging sections resulting from temperature changes and the like. Namely, when the apparatus is not operated for a given period of time, the calibration is executed automatically by utilizing such a no-use period of time. Note that, though the calibration is executed automatically in the example shown in the drawing, the present invention is not limited to that example, and the calibration may naturally be executed by manually selecting arbitrary particular pixels.

Figure 9:
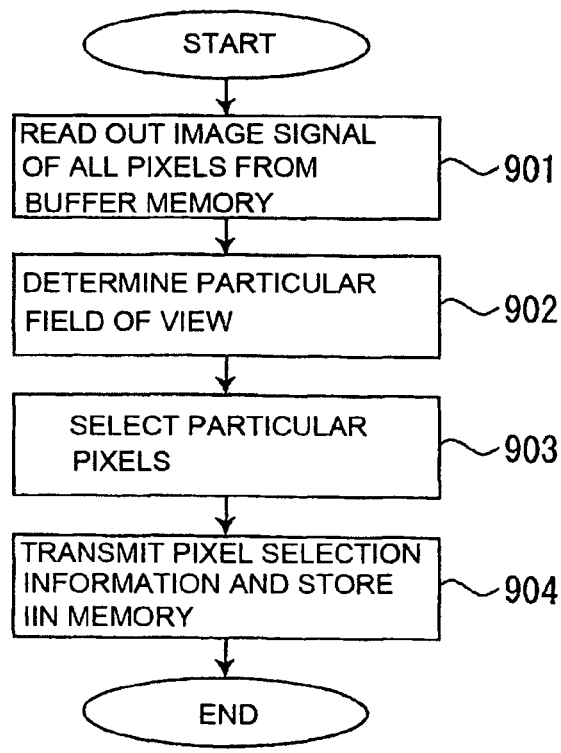
FIG. 9 is a flowchart for explaining the procedure of the pixel range selection with the position detection apparatus according to the present invention.

Next, the procedure for selecting the pixel range will be explained in detail with referring to FIG. 9. FIG. 9 is a flowchart for explaining the procedure for selecting the pixel range in the position detection apparatus according to the present invention. At first, the microcomputer 22 reads out an image signal of all pixels corresponding to imaging field of view of the imaging sections 7 from the buffer memory 20 in accordance with the direction from the personal computer 11 (Step 901). The image signal having been read out is transmitted to the personal computer 11 via the interface, and the personal computer 11 determines a particular field of view of the imaging sections 7 (Step 902). Then, when the particular field of view is determined, particular pixels of the light-sensitive elements in the area image sensor corresponding to the particular field of view is selected (Step 903). The personal computer 11 transmits pixel selection information on the particular pixels having been selected as described above to the microcomputer 22 via the interface, and the microcomputer 22 stores the pixel selection information in the memory section 23 contained inside (Step 904).

Figure 10:
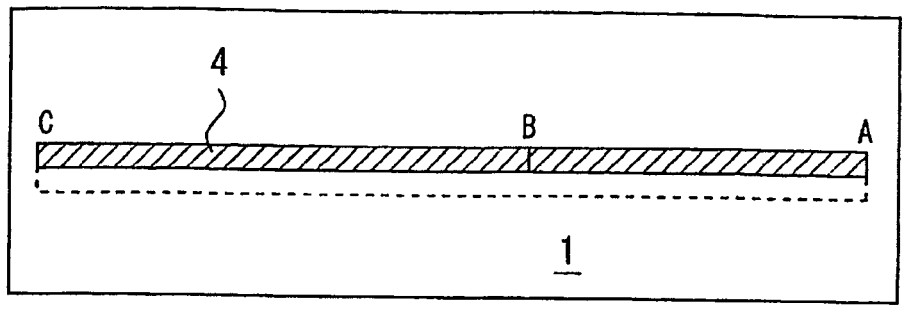
FIG. 10 is a view for explaining an image to be imaged by the imaging sections that are placed so that the fields of view of the imaging sections become parallel to the detection plane.

Hereunder, the respective steps described above will be explained more specifically. For example, when the imaging sections are set so that the field of view thereof is made substantially parallel to the detection plane 1, the image to be imaged by the imaging sections 7 that is read out in Step 901 will be one as shown in FIG. 10. Note that the reference symbols, A, B and C shown in the drawing corresponds to the positions A, B and C marked in the reflex reflection frame 4 in FIG. 5. Referring to FIG. 10, though the area of the reflex reflection frame 4 is the area to be detected brightly, the bright area is reflected, as shown in the drawing, to the side of the detection plane 1 as well to make there a state like a large band of light when the detection plane 1 has a reflecting property like a protective glass. Accordingly, since the upper portion from the lateral central line of the light band area becomes the portion required for the position detection of the pointing device 2, the position corresponding to the whole of the light band area in the upper side from the central line may be determined as the particular field of view (Step 902). Note that, in order to reduce data to be transmitted, it is not required to determine the area including all of the portions corresponding to the reflex reflection frame 4 as the particular field of view, and it is preferable to determine the part thereof, specifically the part locating over the central line and being the nearest, as the particular field of view, since it makes the maneuverability better as well. Hence, the portion as much as closer to the central line may be determined as the particular field of view, since the more the particular field of view becomes closer to the detection plane, the more it can reduce erroneous detections of the pointing device and errors.

Then, when the particular field of view is determined, particular pixels of the light-sensitive elements in the area image sensor corresponding to the particular field of view is selected in Step 903. The particular pixels may be selected in a linear pattern in accordance with the pixel array of the light-sensitive elements in the area image sensor. Besides, when the imaging sections are provided in an inclined state, pixels arraying obliquely may be selected, whereas when the particular field of view is not straight due to distortion of the detection plane or the like, pixels may be selected alongside of the distortion.

Figure 11A:
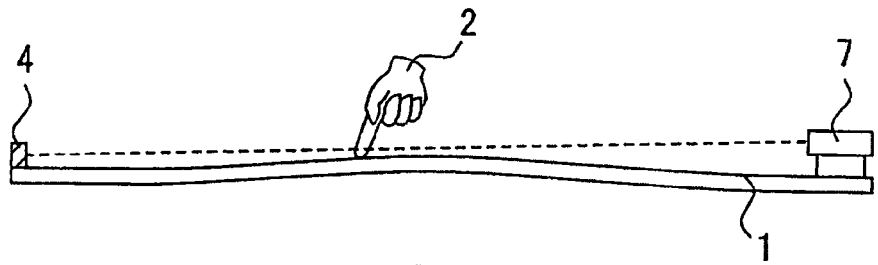
FIG. 11 is a view for explaining particular pixels to be selected when the imaging sections are raised in their position so as to downwardly view a pointing device.
Figure 11B:
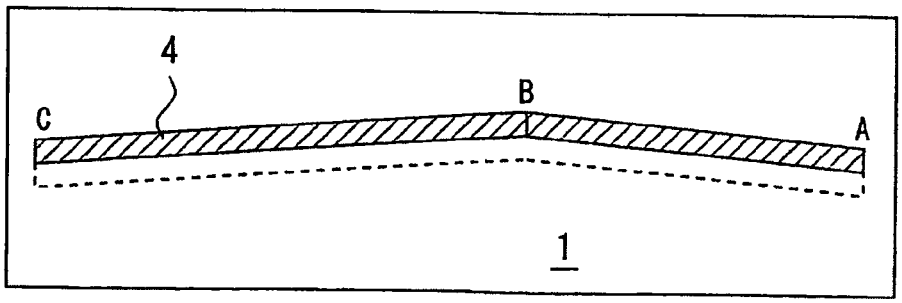
Figure 11C:
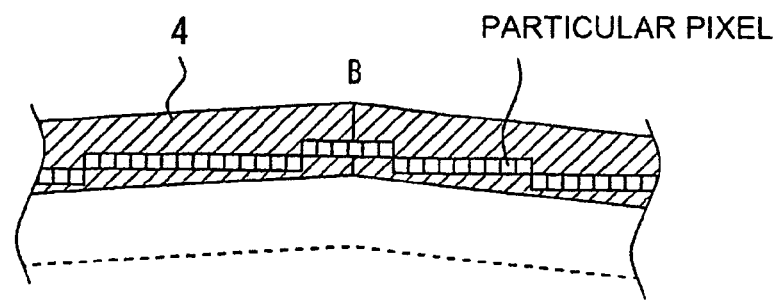

Besides, when the setting position of the imaging sections are heightened in order to avoid the reflex reflection frame from being out of the field of view due to the distortion of the detection plane 1 or the like and thereby being unable to detect the pointing device, as shown FIG. 11(a), the image to be imaged by the imaging sections 7 becomes one as shown in FIG. 11(b). Note that the reference symbols A, B and C in this drawing correspond to the positions A, B and C being marked to the reflex reflection frame 4 shown in FIG. 5. Though the reflex reflection frame 4 locating at the angled portion of the detection plane 1 is viewed in the inflected state as shown in FIG. 11(b), the reflex reflection frame 4 can be included in the particular field of view by selecting pixels arraying with containing the inflected portion as the particular pixels as shown in FIG. 11(c). Then, the pixel selection information on the particular pixels is stored in the memory section 23 in the microcomputer 22.

Figure 12:
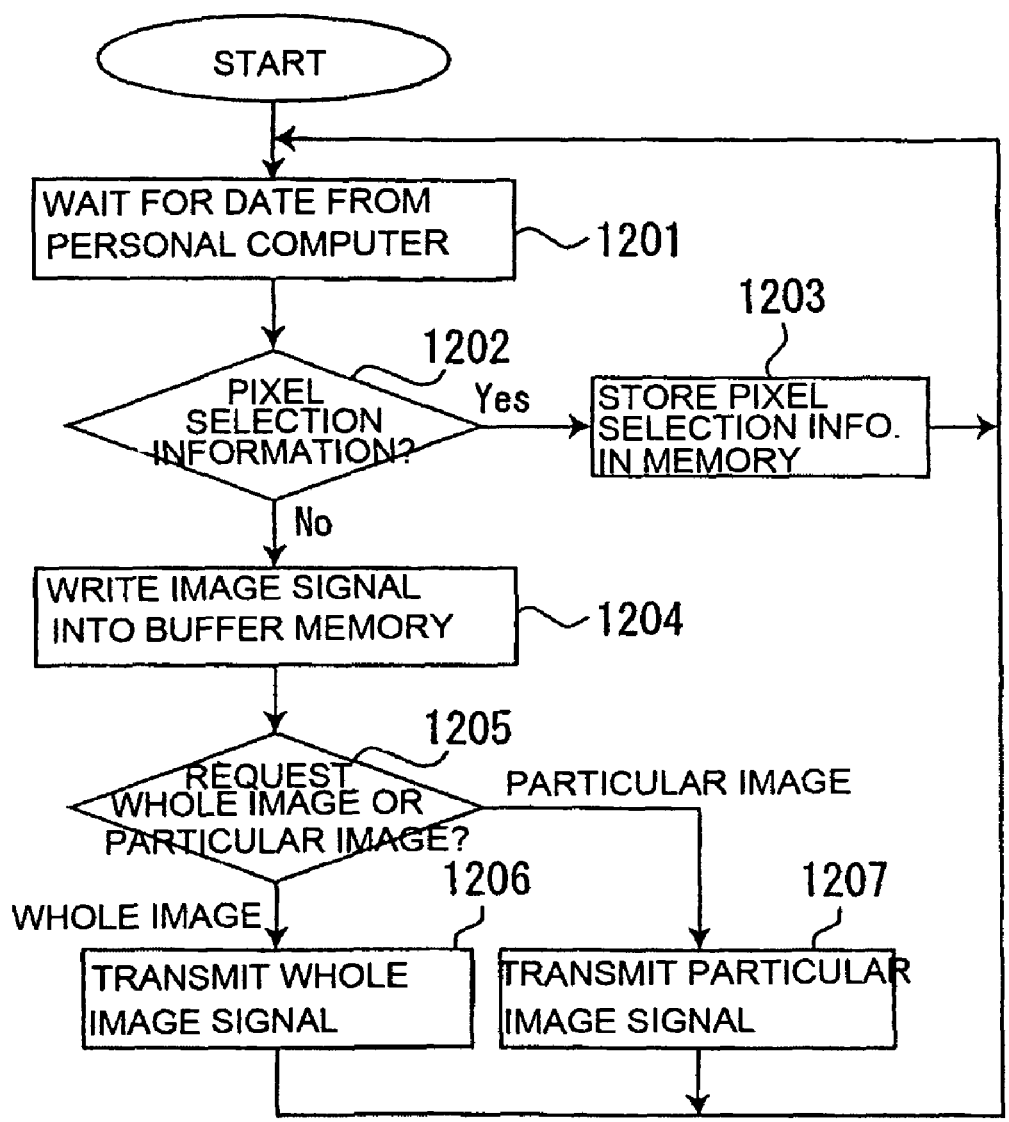
FIG. 12 is a flowchart for explaining the processing procedure in a microcomputer used for the position detection apparatus according to the present invention.

Next, the processing procedure in the microcomputer 22 will be explained in the following. FIG. 12 is a flowchart for explaining the processing procedure in the microcomputer 22 used for the position detection apparatus according to the present invention. At first, the microcomputer 22 waits for data transmitted from the personal computer 11 (Step 1201), and if the transmitted data is the pixel selection information (Step 1202), it stores the pixel selection information in the memory section 23 (Step 1203). When the transmitted data is not the pixel selection information (Step 1202), the microcomputer 22 writes the image signal having been sent from the two imaging sections 7 into the buffer memory 20 so that the image signal may be held in an area where the pixel counters continue in accordance with the produced address (Step 1204). When the instruction from the personal computer 11 is an image request, the microcomputer determines whether the request is a whole image request or a particular image request (Step 1205). Besides, when the request is a whole image request for the calibration, the microcomputer transmits the whole image signal in the buffer memory to the personal computer 11 via the interface (Step 1206). When the instruction from the personal computer 11 is a particular image request, the microcomputer transmits a particular image signal corresponding to the selected particular pixels to the personal computer 11 via the interface following to randomly accessing the buffer memory on the basis of the image selection information stored in the memory section 23 to read out the particular image signal (Step 1207).

As described above, since the position detection apparatus according to the present invention does not require severe position adjustment and the like as to the setting position of the imaging sections, the manufacturing cost thereof can be rendered lower and the maintenance for the apparatus can be made advantageous. Furthermore, since only the particular image signal for required particular pixels is transmitted at the time of performing the position detection, no dedicated interface with high-speed performance will be required. Still further, since the calculation of the coordinate and the like is executed at the personal computer side, no dedicated expensive processing circuit will be required. Still further, since the field of view of the imaging sections can be adjusted to a position as much as closer to the detection plane without executing physical position adjustment of the imaging sections, the detection accuracy will be increased and the maneuverability will be improved.

Figure 14A:
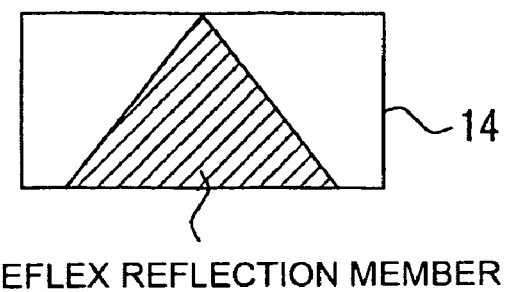
FIG. 14 is a view for explaining an example of the marker member used in the position detection apparatus shown in FIG. 13.
Figure 14B:
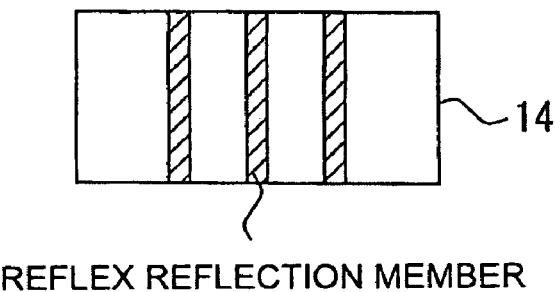

The position detection apparatus of the interception type, in which the reflex reflection frame is provided around the detection plane and the position of the shade formed by intercepting light with the reflex reflection frame is detected by means of the imaging sections, had been explained in the example described above. In the following, the position detection apparatus of the light-emitting type, in which the reflex reflection frame is not provided, but instead thereof, a reflex reflection member 13 is provided to the pointing device 2, and the position of the bright portion in the reflex reflection member is detected in the imaging sections, is explained with referring to FIG. 13. FIG. 13 is a view for explaining an example wherein the position detection apparatus according to the present invention is applied for the other system. In this drawing, the components marked with like reference numerals as those in FIG. 5 denote like components as those in FIG. 5, and the basic configuration is similar to that shown in FIG. 5. Further, the processing procedure and the like are basically similar to the procedures having been shown in FIGS. 8, 9 and 12. In this example, the determination procedure in the process of determining the particular field of view of the imaging sections that corresponds to the same procedure in Step 902 shown in FIG. 9 is different from the later. In this example, since the apparatus includes no reflex reflection frame, it is not possible to determine the particular field of view before hand with the reflex reflection frame. Therefore, instead thereof, marker members each functioning as the reference for defining the particular field of view of the imaging sections 7 are provided around the detection plane 1. As shown in FIG. 13, the marker members 14 are provided to at least four points of the detection plane 1. The respective reference symbol A, B or C indicated for the marker members is a marker to be imaged by the imaging section 7 locating at the right side. The marker member 14 is a reflex reflection member that is configured such that, for example, the reflected image produced by the marker member is formed in a characteristic shape, for example, a triangular shape different from the shape of the tip of the pointing device 2, as shown in FIG. 14(a). Alternatively, the marker member may be one configured by forming the reflex reflection member in a stripe pattern or the like, as shown in FIG. 14(b). Namely, the shape of the marker member is not limited to the example as shown in these drawings and can be various types as far as it is configured so as to produce a characteristic image that is hardly misidentified with the image of the pointing device 2 to be placed on the detection plane 1. Further, the marker member 14 may be formed with a light-emitting source such as an LED, instead of using a reflex reflection member. In this case, though the marker member is configured so that the light-emitting image produces a characteristic shape, it may be configured such that the light-emitting source emits light only at the time of defining the particular field of view of the imaging sections 7, that is, only at time of calibration. With such a configuration, the influence caused by the light-emitting source can be prevented from occurring and electric power consumption can be reduced.

Figure 15:
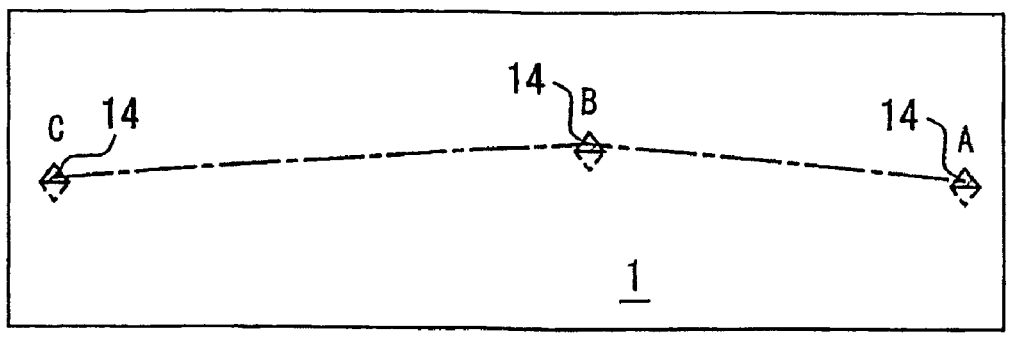
FIG. 15 is a view for explaining an image to be imaged by the imaging sections when the marker member is used.

In the position detection apparatus configured as described above, the image formed in the field of view of the imaging sections 7 becomes one as shown in FIG. 15. Accordingly, in Step 902 in FIG. 9 for determining the particular field of view of the imaging sections 7, the line forming the image of the marker member 14 may be determined as the particular field of view.

Besides, when the field of view of the imaging sections has been changed due to, for example, tremors of the imaging section resulting from temperature changes or the like and distortions of the detection plane, it is also capable of applying a follow-up function, for example, for detecting changes in the position of the marker member to renewedly adjust the field of view thereof to the apparatus. This follow-up function may naturally be operated automatically at a given interval or manually operated at operator's option.

Figure 16:
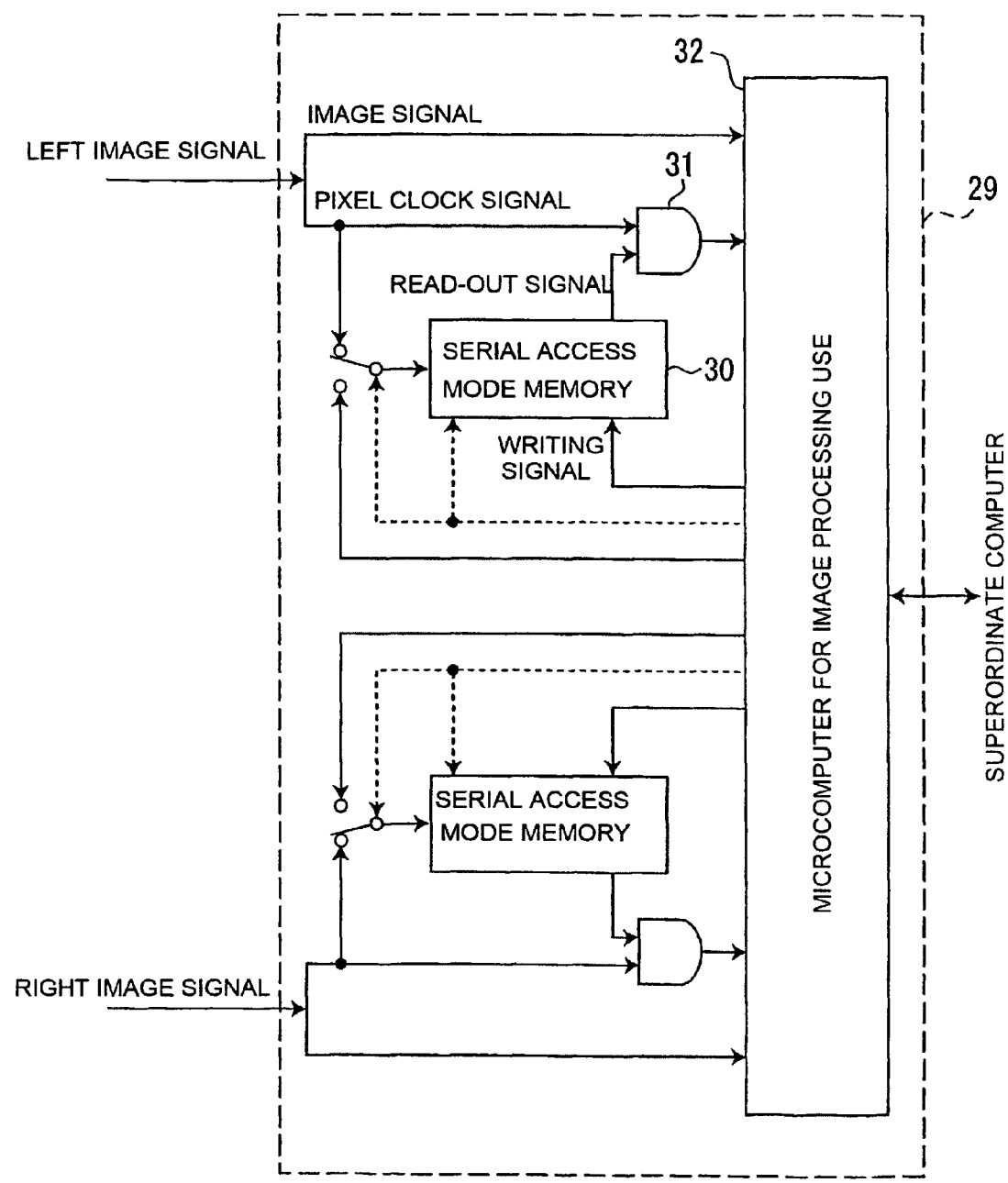
FIG. 16 is a view for explaining an example of a different configuration of the control section to be used in the position detection apparatus according to the present invention.

Next, the other example of the control section 10 being used for the position detection apparatus according to the present invention will be explained in the following with referring to FIG. 16. Though the control section 10 having been described with referring to FIG. 7 is configured by including a buffer memory and a pixel counter, the control section 29 shown in FIG. 16 is different from the former in the feature of including a memory of the serial access mode instead of said memory and counter. Further, the control section 29 is shown in FIG. 16 such that it includes a microcomputer to be used for the image processing so that the image processing is executed in the control section with use of the microcomputer. However, the present invention is not limited to this configuration, and the image processing may naturally be executed with use of a superordinate personal computer. Though two imaging sections 7 are provided at the right and left sides, the following explanation will be made for only one of them since the image processing executed in the respective imaging sections is the same.

The image signal (image data) corresponding to all pixels sent from the area image sensor in the imaging sections 7 is inputted to the microcomputer 32 for image processing use. Note that it may also be configured such that an image signal having been roughly restricted to a partial range by means of a mode capable of restricting the imaging range is inputted to the microcomputer, if such a mode is provided to the area image sensor side. Further, a pixel clock signal in the image signal sent alongside of the scanning line of the area image sensor is inputted to a memory section 30 of the serial access mode and to one of AND circuits 31 at the input side. Then, a read-out signal that is an output of the memory section 30 of the serial access mode to the other one of the AND circuits at the input side, and an output of the AND circuit 31 is inputted to the microcomputer 32 for image processing use. In this concern, the memory section 30 of the serial access mode is specifically a memory that can execute reading and writing of 1 bit information sequentially in synchronization with an input clock, and the pixel selection information having been stored beforehand is, for example, information that is read out as a read-out signal corresponding to the building-up of the clock signal to be inputted. For the memory section of the serial access mode, for example, a serial flush memory manufactured by ST Microelectronics Co., Ltd. can be used. Now, the operation timing of the respective signals will be explained in the following with referring to FIG. 17.

Figure 17:
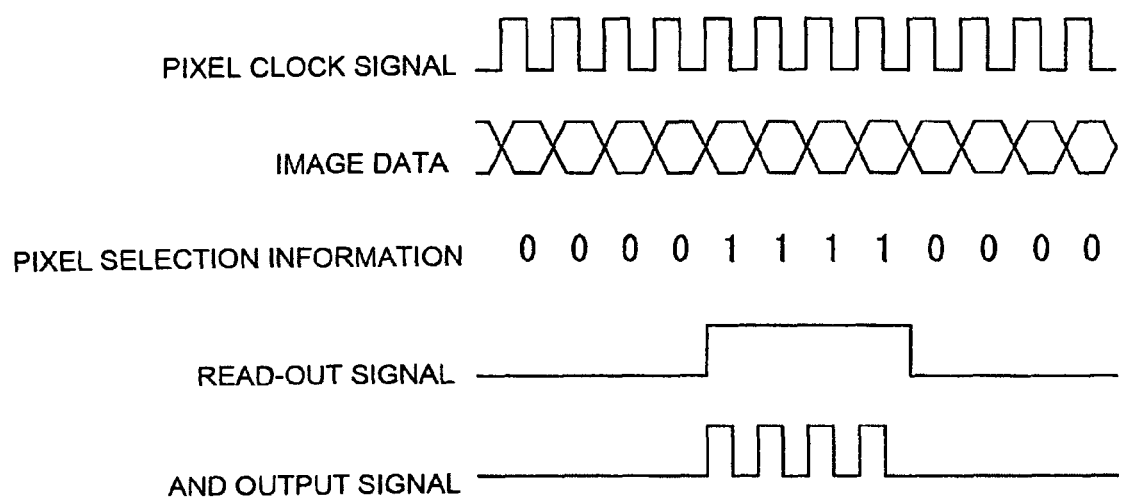
FIG. 17 is a timing chart for explaining the timings of respective signals in the control section with the configuration shown in FIG. 16.

FIG. 17 is a timing chart for explaining the operation timings of the respective signals in the control section shown in FIG. 16. As shown in this drawing, the image data is changed over at every occasion of the building-up of the respective clock signals. Since the image selection information having been stored beforehand is read out as a read-out signal corresponding to the building-up of the pixel clock signal, the read-out signal becomes one, for example, as shown in FIG. 17. Thus, the output of the AND circuit 31 becomes HIGH when the timings of both of the pixel clock signal and the read-out signal are HIGH. In the microcomputer 32 for image processing use, the image data is extracted when the image data comes to the stable state, that is, corresponding to the lagging edge of the AND circuit output.

Now, the processing procedure for the control section 29 configured as described above will be explained in the following. The microcomputer 32 for image processing use executes substantially the same processings as those in the image processing procedures explained in connection with FIGS. 8, 9 and 12. Hence, particular pixels corresponding to a particular field of view are determined at first in accordance with the pixels range selection procedure (Step 801). The procedure for determining the particular pixels may be determined appropriately from the image of the reflex reflection frame or the image of the marker means, similarly to the procedure described in the above. Since the image signals are inputted to the microcomputer 32 for image processing use all the time, the control section 29 of this example may use those image signals to determine the particular pixels. Then, the image selection information with respect to the determined particular pixels is stored previously in the memory section 30 of the serial access mode. When the indicating position coordinate of the pointing device is detected, since the output of the AND circuit 31 becomes HIGH when both of the read-out signal of the memory section 30 of the serial access mode and the pixel clock signal are HIGH, the image signal is extracted when the output of the AND circuit 31 is HIGH, preferably at the time of lagging edge of the image signal at which the image signal gets stable. In this way, the particular image signal corresponding to the particular pixels having been selected on the basis of the pixel selection information is inputted. In the microcomputer 32 for image processing use, the image processing is executed on the basis of the particular image signal, and the indicating position coordinate of the pointing device is outputted from the position of either the shade formed by the pointing device or light. In the example shown in FIG. 16, since a coordinate data with less volume is outputted, the coordinate data is transmitted to a superordinate personal computer via an interface such as low-speed RS-232C or the like. Note that a microcomputer with which the procedure merely up to the extraction of the particular image signal is executed may be used, instead of using the microcomputer for image processing use that executes the procedure up to the calculation for the coordinate. In this case, the particular image signal may be transmitted to a personal computer via an interface and the image processing such as the calculation for the coordinate may be executed at the personal computer side.

With the configuration as described above, the cost for the product can be prevented from increasing since it will be possible for the apparatus to use a memory having a capacity being less than the buffer memory used in the example having been explained for FIG. 7.

It must be noted that the position detection apparatus according to the present invention is not limited to the examples shown in the drawings, and that various modifications thereof can be made naturally without departing from the gist of the present invention. The position detection system of the position detection apparatus according to the present invention may be either the interception type or the light-emitting type as far as the area image sensor is used as the imaging element in the imaging sections and a means capable of selecting pixels corresponding to a particular field of view in the imaging field of view of the sensor is used.

As described above, with the position detection apparatus according to the present invention, such excellent effects that the setting position adjustment of the imaging sections is not required, the maintenance is made easy, the position detection is not influenced by environmental changes such as temperature changes, and the position detection apparatus realizable with low-cost components can be provided can be exerted. Since the particular field of view of the imaging section is easily determined in the position detection apparatus according to the present invention, the position detection apparatus can be attached to an existing display device to easily provide a touch-panel display apparatus. Furthermore, since the particular field of view can be defined effectively even though a reflex reflection frame with a narrow width is used, the frame cannot be an obstacle, which can provide the position detection apparatus with good maneuverability.

What is claimed is:

1. A position detection apparatus for detecting a pointing device being situated on a detection plane, said position detection apparatus comprising:
    a pair of imaging sections, each imaging section comprising an area image sensor in which light-sensitive elements are arrayed in a two-dimensional pattern to produce a two-dimensional image of pixels, and an image formation lens, and the pair of the imaging sections image an area over the detection plane in a given field of view from two lateral sides of the detection plane to output an image signal corresponding to all pixels of the given field of view, wherein the two-dimensional image includes a two-dimensional space that is both parallel to the detection plane and perpendicular to the detection plane;
    marker means disposed to at least four peripheral corners of the detection plane and each functioning as a reference for defining a particular field of view along a distortion of the detection plane within a range of the given field of view to be imaged by the imaging sections;
    a selection means utilizing the image signal as an input to select particular pixels as a portion of all of the pixels in the two dimensional space along the distortion of the detection plane, corresponding to the particular field of view within the range of the given field of view from the light-sensitive elements, only the particular pixels of the particular field of view configured for processing, the particular pixels comprising:
        a first row of a plurality of pixels parallel to the detection plane; and
        a second row of a plurality of pixels parallel to the detection plane, the second row being different from the first row, wherein the second row of the plurality of pixels comprises a number of pixels different from a number of pixels for the first row of the plurality of pixels; and
    an image processing means, which utilizes a particular image signal corresponding to the particular pixels having been selected by the selection means as an input to execute the image processing, thereby outputting a coordinate of an indicating position on the detection plane indicated by the pointing device.

2. A position detection apparatus as claimed in claim 1, wherein the imaging section further includes a light source for emitting light alongside of the detection plane and the light source is placed in the vicinity of the image formation lens.

3. A position detection apparatus as claimed in claim 2, characterized by further including a reflex reflection member for reflex-reflecting the light.

4. A position detection apparatus as claimed in claim 3, wherein the reflex reflection member is provided to the pointing device.

5. A position detection apparatus as claimed in claim 1, wherein the marker means is a reflex reflection member being configured such that the reflected image thereof is formed in a characteristic shape.

6. A position detection apparatus as claimed in claim 1, wherein the marker means is a light-emitting section for emitting light.

7. A position detection apparatus as claimed in claim 1, wherein the apparatus further includes a calibration means and the calibration means causes the selection means automatically at a given interval or manually at operator's option to select particular pixels.

8. A position detection apparatus as claimed in claim 1, wherein the particular pixels to be selected by the selection means are any of-pixels being obliquely arrayed.

9. A position detection apparatus as claimed in claim 1, wherein the apparatus further includes a memory for storing pixel selection information with respect to the particular pixels to be selected by the selection means and the selection means uses the pixel selection information having stored in the memory to output a particular image signal corresponding to the particular pixels from the image signal to be imaged by the imaging sections.

10. A position detection apparatus as claimed in claim 1, wherein a high-speed serial transfer interface is provided in between the selection means and the image processing means so that the interface connect them and the image processing means is included in a personal computer.

11. A position detection apparatus as claimed in claim 1, wherein the image processing means is consisted of a microcomputer and the coordinate of the indicating position is outputted through an interface included in the microcomputer.

12. A position detection apparatus as claimed in claim 1, wherein the apparatus further includes a display device and the detection plane is a transparent plate that protects the display screen of the display device.

13. A position detection apparatus for detecting a pointing device being situated on a detection plane, the position detection apparatus comprising:
a pair of imaging sections, each of those which includes an area image sensor, in which light-sensitive elements are arrayed in a two-dimensional pattern to produce a two-dimensional image, and an image formation lens, and images an area over the detection plane in a given field of view from two lateral sides of the detection plane to output an image signal corresponding to all light-sensitive elements of the given field of view, wherein the two-dimensional image includes a two-dimensional space that is both parallel to the detection plane and perpendicular to the detection plane;
marker means each functioning as a reference for defining a particular field of view along a distortion of the detection plane within a range of the given field of view to be imaged by the imaging sections, the marker means comprising at least one of the following two structures: a light reflection member and a light-emitting source;
an image processing means that utilizes the image signal being outputted from the imaging sections as an input, defines a given part of the image signal on the basis of a line forming images of the marker means, and uses the image signal of the given part having been defined to work out a coordinate of an indicating position on the detection plane being indicated by a pointing device;
the given part of the image signal comprising a configuration of a portion of the plurality of the light-sensitive elements in the two-dimensional space along the line, only the configuration of the light-sensitive elements are utilized for detecting a pointing device, the configuration comprising:
a first row of a plurality of light-sensitive elements parallel to the detection plane; and
a second row of a plurality of light-sensitive elements parallel to the detection plane, the second row being different from the first row, wherein the second row of the plurality of light-sensitive elements comprises a number of light-sensitive elements different from a number of light-sensitive elements for the first row of the plurality of light-sensitive elements; and
a follow-up means for detecting the changes in the positions of the marker means either automatically at a given interval or manually at operator's option to renewedly define the given part.

14. A position detection apparatus comprising:
a detection plane;
an imaging system positioned relative to the detection plane and comprising a field of view for imaging that includes the detection plane and an area over the detection plane, the imaging system producing a two-dimensional image of the field of view; and
an image processing system coupled to the imaging system and comprising the capability to periodically:
activate the imaging system to image the orientation of the detection plane relative to the area over the detection plane;
determine if the orientation of the detection plane relative to the area over the detection plane has changed; and
adjust the field of view of the imaging system in response to a determination that the orientation of the detection plane has changed relative to the area over the detection plane,
wherein the field of view comprises a plurality of rows of pixels extending perpendicular to the detection plane with each row being parallel to the detection plane, and wherein the image processing system is configured to utilize only a subset of the plurality of rows of pixels selected according to the orientation of the detection plane for a detection process to output a coordinate of an indicating position on the detection plane, the subset comprising:
a first row of a plurality of pixels; and
a second row of a plurality of pixels, the second row being different from the first row and comprising a number of pixels different from a number of pixels for the first row of the plurality of pixels.

15. The position detection apparatus of claim 14 wherein the image processing system comprises the capability to determine a coordinate on the detection plane of an indicating position being indicated by a pointing device.

16. The position detection apparatus of claim 14 wherein the image processing system comprises a computer coupled to the detection plane and the imaging system.

17. A method for detecting a position of a pointing device relative a detection plane, said method comprising:
providing a position detection apparatus comprising:
a detection plane;
an imaging system positioned relative to the detection plane and comprising a field of view for imaging that includes the detection plane and an area over the detection plane, the imaging system producing a two-dimensional image of the field of view; and
an image processing system coupled to the imaging system and configured to process images provided by the imaging system;
utilizing the image processing system to periodically activate the imaging system to image the orientation of the detection plane relative the area over the detection plane;
utilizing the image processing system to periodically determine if the orientation of the detection plane relative to the area over the detection plane has changed; and
utilizing the image processing system to periodically adjust the field of view of the imaging system in response to a determination that the orientation of the detection plane has changed relative to the area over the detection plane wherein the field of view comprises a plurality of rows of pixels extending perpendicular to the detection plane with each row being parallel to the detection plane, and wherein the image processing system is configured to utilize only a subset of the plurality of rows of pixels selected according to the orientation of the detection plane for a detection process to output a coordinate of an indicating position on the detection plane, the subset comprising:

a first row of a plurality of pixels; and a second row of a plurality of pixels, the second row being different from the first row and comprising a number of pixels different from a number of pixels for the first row of the plurality of pixels.

18. A position detection apparatus as claimed in claim 1, wherein the second row of the plurality of pixels comprises pixels occupying specific pixel locations within the second row that are different from corresponding specific pixels locations within the first row occupied by pixels of the first row of the plurality of pixels.

19. A position detection apparatus as claimed in claim 13, wherein the second row of the plurality of light-sensitive elements comprises light-sensitive elements occupying specific locations within the second row that are different from corresponding specific locations within the first row occupied by light-sensitive elements of the first row of the plurality of light-sensitive elements.

\* \* \* \* \*

UNITED STATES PATENT AND TRADEMARK OFFICE
CERTIFICATE OF CORRECTION

PATENT NO. : 8,330,726 B2
APPLICATION NO. : 10/557325
DATED : December 11, 2012
INVENTOR(S) : Yasuji Ogawa and Kenji Tsunezaki It is certified that error appears in the above-identified patent and that said Letters Patent is hereby corrected as shown below:

In the Specification

Column 1, line 30 – Replace "wave that is" with --waves that are--

Column 1, line 32 – Replace "wave is" with --waves is--

Column 1, line 46 – Replace "an the like" with --and the like--

Column 5, line 50 – Replace "of an given" with --of a given--

Column 9, line 21 – Replace "an coordinate" with --a coordinate--

Column 9, line 27 – Replace "locating at" with --located at--

Column 12, line 6 – Replace "locating at" with --located at--

Column 12, line 55 – Replace "position as much as closer" with --position much closer--

Column 13, line 14 – Replace "from the later." with --from the latter.--

Column 13, line 24 – Replace "locating at" with --located at--

In the Claims

Column 17, line 15, Claim 10 – Replace "connect them" with --connects them--

Signed and Sealed this
Tenth Day of September, 2013

Teresa Stanek Rea
*Acting Director of the United States Patent and Trademark Office*